United States Patent [19]
McAlea et al.

[11] Patent Number: 5,733,497
[45] Date of Patent: Mar. 31, 1998

[54] SELECTIVE LASER SINTERING WITH COMPOSITE PLASTIC MATERIAL

[75] Inventors: Kevin P. McAlea; Paul F. Forderhase, both of Austin; Mark E. Ganninger, Pflugerville, all of Tex.; Frederic W. Kunig, Akron; Angelo J. Magistro, Brecksville, both of Ohio

[73] Assignee: DTM Corporation, Austin, Tex.

[21] Appl. No.: 527,840

[22] Filed: Sep. 13, 1995

Related U.S. Application Data

[62] Division of Ser. No. 414,634, Mar. 31, 1995, abandoned.

[51] Int. Cl.$^6$ .................. B29C 35/08; B29C 41/02
[52] U.S. Cl. .................. 264/497; 264/113; 264/122; 264/125; 264/126; 264/308
[58] Field of Search .................. 264/113, 122, 264/125, 126, 308, 497; 156/62.2, 272.8

[56] References Cited

U.S. PATENT DOCUMENTS

| | | | |
|---|---|---|---|
| 4,247,508 | 1/1981 | Housholder | 264/219 |
| 4,528,306 | 7/1985 | Shigehiro et al. | 523/219 |
| 4,599,370 | 7/1986 | Grossman et al. | 523/200 |
| 4,692,480 | 9/1987 | Takahashi et al. | 523/218 |
| 4,761,440 | 8/1988 | Laroche | 523/217 |
| 4,839,394 | 6/1989 | Champion | 521/55 |
| 4,863,538 | 9/1989 | Deckard | 156/62.2 X |
| 4,885,321 | 12/1989 | Nitoh et al. | 523/219 |
| 4,938,816 | 7/1990 | Beaman et al. | 156/62.2 |

(List continued on next page.)

FOREIGN PATENT DOCUMENTS

| | | |
|---|---|---|
| 0589706 | 3/1994 | European Pat. Off. . |
| 0595187 | 5/1994 | European Pat. Off. . |
| 2922152 | 12/1980 | Germany . |
| 3533625 | 4/1989 | Germany . |
| 4305201 | 4/1994 | Germany . |
| 63-027858 | 2/1988 | Japan . |
| WO92/08566 | 5/1992 | WIPO . |
| WO 9210343 | 6/1992 | WIPO . |
| WO96/06881 | 3/1996 | WIPO . |

OTHER PUBLICATIONS

"The SLSTM Selective Laser Sintering Process: An Update on the Technology, Materials, and Applications", K.L.Nutt, 1992, 8 pages.

*Primary Examiner*—Leo B. Tentoni
*Attorney, Agent, or Firm*—Anderson, Levine & Lintel

[57] ABSTRACT

A composite powder specially adapted for use in selective laser sintering is disclosed. The composite powder includes a polymer powder dry mixed with a reinforcement powder, where the polymer powder has a melting temperature substantially lower than that of the reinforcement powder. In the case where nearfully dense parts are to be formed, the first constituent powder is preferably a semi-crystalline powder, for example nylon 11, of a composition suitable for forming near-fully dense parts when used unblended in selective laser sintering; if porous parts are desired, the polymer powder is an amorphous powder, such as polycarbonate, polystyrene, acrylates, and styrene/acrylate copolymers. The reinforcement powder is preferably microspheres of glass, preferably coated to enhance wetting and adhesion with the polymer powder when selective laser sintering is performed. Besides improving the stiffness and heat resistance of the part produced, the composite powder widens the process window over that provided by unblended powder, provides improved dimensional accuracy in the part produced, and facilitates roughbreakout and smooth finishing of the part produced.

34 Claims, 2 Drawing Sheets

U.S. PATENT DOCUMENTS

| | | | |
|---|---|---|---|
| 4,944,817 | 7/1990 | Bourell et al. | 156/62.2 X |
| 5,017,753 | 5/1991 | Deckard | 219/121.63 X |
| 5,071,727 | 12/1991 | Ikeda et al. | 430/110 |
| 5,076,869 | 12/1991 | Bourell et al. | 156/62.2 X |
| 5,147,587 | 9/1992 | Marcus et al. | 264/434 |
| 5,155,321 | 10/1992 | Grube et al. | 219/121.65 X |
| 5,155,324 | 10/1992 | Deckard et al. | 264/497 |
| 5,156,697 | 10/1992 | Bourell et al. | 156/62.2 X |
| 5,182,170 | 1/1993 | Marcus et al. | 428/551 |
| 5,252,264 | 10/1993 | Forderhase et al. | 264/497 |
| 5,255,057 | 10/1993 | Stetler et al. | 355/246 |
| 5,296,062 | 3/1994 | Bourell et al. | 156/62.2 |
| 5,304,329 | 4/1994 | Dickens, Jr. et al. | 264/497 |
| 5,342,919 | 8/1994 | Dickens, Jr. et al. | 528/323 |
| 5,352,405 | 10/1994 | Beaman et al. | 419/45 |
| 5,373,046 | 12/1994 | Okamura et al. | 524/413 |
| 5,380,774 | 1/1995 | Mulholland | 524/102 |
| 5,382,308 | 1/1995 | Bourell et al. | 156/62.2 |
| 5,385,780 | 1/1995 | Lee | 428/325 |
| 5,437,820 | 8/1995 | Brotz | 264/497 |
| 5,439,628 | 8/1995 | Huang | 264/175 |
| 5,527,877 | 6/1996 | Dickens, Jr. et al. | 264/497 X |

SELECTIVE LASER SINTERING WITH COMPOSITE PLASTIC MATERIAL

The present application is a divisional of application Ser. No. 08/414,634, filed Mar. 31, 1995, now abandoned.

This application is related to copending application Ser. No. 08/298,076, filed Aug. 30, 1994, now U.S. Pat. No. 5,527,877 assigned to DTM Corporation, and incorporated herein by this reference.

This invention is in the field of producing three-dimensional objects such as prototype parts by way of selective laser sintering of powders, and is more specifically directed to materials for use in selective laser sintering.

BACKGROUND OF THE INVENTION

Recent advances have been made in the field of producing three-dimensional objects, such as prototype parts and finished parts in small quantities, directly from computer-aided-design (CAD) data bases. Various technologies are known to produce such parts, particularly through the use of additive processes, as opposed to subtractive processes such as conventional machining. An important additive process for the production of such objects is selective laser sintering, developed and popularized by DTM Corporation. According to the selective laser sintering process, a powder is scanned in layerwise fashion by a directed energy beam, such as a laser, to fuse the powder at selected locations corresponding to cross-sections of the object. Fused locations within each layer adhere to fused portions of previously fused layers, so that a series of layers processed in this manner results in a finished part. Computer control of the scanning of the energy beam thus enables direct transfer of a design in a computer-aided-design (CAD) data base into a physical object.

This method, and apparatus for performing the same, are described in further detail in U.S. Pat. No. 4,247,508, issued Jan. 27, 1981; U.S. Pat. No. 5,252,264, issued Oct. 12, 1993; and in U.S. Pat. No. 5,352,405, issued Oct. 4, 1994; all assigned to DTM Corporation and incorporated herein by this reference. Further detail is also provided in U.S. Pat. No. 4,863,538, issued Sep. 9, 1989; U.S. Pat. No. 5,017,753 issued May 21, 1991; U.S. Pat. No. 4,938,816 issued Jul. 3, 1990; U.S. Pat. No. 4,944,817 issued Jul. 31, 1990; U.S. Pat. No. 5,076,869, issued Dec. 31, 1991; U.S. Pat. No. 5,296,062, issued Mar. 22, 1994; and U.S. Pat. No. 5,382,308, issued Jan. 17, 1995; all assigned to Board of Regents, The University of Texas System and incorporated herein by this reference. Further refinements in the selective laser sintering process, and advanced systems and machines for performing selective laser sintering, are described in U.S. Pat. No. 5,155,321 issued Oct. 13, 1992, commonly assigned herewith, U.S. Pat. No. 5,155,324 issued Oct. 13, 1992, and International Publication WO 92/08566, all of which are incorporated herein by reference.

As described in the above-referenced patents, and in U.S. Pat. No. 5,156,697 issued Oct. 20, 1992, U.S. Pat. No. 5,147,587 issued Sep. 15, 1992, and in U.S. Pat. No. 5,182,170, issued Jan. 26, 1993, all also assigned to Board of Regents, The University of Texas System and incorporated herein by this reference, various materials and combinations of materials can be processed according to this method, such materials including plastics, waxes, metals, ceramics, and the like. In addition, as described in these patents and applications, the parts produced by selective laser sintering may have shapes and features which are sufficiently complex as to not be capable of fabrication by conventional subtractive processes such as machining. This complexity is enabled by the natural support of overhanging fused portions of the object that is provided by unfused powder remaining in prior layers.

Specifically, the above-referenced U.S. Pat. No. 5,382,308 and its parent patents describe systems of multiple material powders useful in selective laser sintering. These multiple material powders include blends of powders of materials with different melting (or bonding or dissociation) temperatures, for example a mixture of glass powders with alumina powders. This patent also describes various examples of coated powders, where one material is coated with another.

By way of further background, U.S. Pat. No. 5,342,919, issued Aug. 30, 1994, assigned to DTM Corporation and incorporated herein by this reference, discloses powder systems that are especially useful in the fabrication of a near-fully dense article by selective laser sintering. An example of such a powder is a powder of nylon 11, having a number average molecular weight in the range from 75,000 to 80,000, a molecular weight distribution in the range from 1.2 to 1.7, and which is ground to produce particles having a sphericity of greater than 0.5 and a certain distribution of particle sizes.

By way of still further background, the use of plastic matrix composite materials, including a plastic and a reinforcement material, are widely used in the plastics molding industry. Examples of common reinforcement materials in this field include carbon, glass, and many other relatively inexpensive fillers. These reinforcements, in fiber, microsphere, or particulate form, are typically compounded with thermoplastic polymers into a mold compound. This mold compound is typically extruded and sliced, or otherwise formed, into a shape suitable for injection molding for production of the reinforced parts. As is well known in the injection molding art, the resultant part is generally stiffer and stronger than would be a similarly shaped injection molded part of an unreinforced thermoplastic. It is also well known that the coefficient of thermal expansion (CTE) of reinforced molded parts are lower than unreinforced molded plastic parts, reducing molding stress and improving the dimensional accuracy of the molded part. Further, it is also well known that, since the reinforcement material is generally less expensive than thermoplastic material, these composite materials for injection molding are less expensive than unreinforced thermoplastic for injection molding.

Of course, the compounded powder as conventionally used for injection molding is unsuitable for use in the selective laser sintering process.

The selective laser sintering process is primarily a thermal process, as the object is formed by the sintering or other fusing of powder at selected locations of a layer that receive directed energy from the laser sufficient to reach the fusing or sintering temperature. Those portions of each powder layer that do not receive the laser energy are to remain unfused, and thus must remain below the fusing or sintering temperature. In addition, the temperature of the powder receiving the laser energy will generally be higher than the temperature of underlying prior layers (fused or unfused). As such, significant thermal gradients are present at the target surface of the powder in the selective laser sintering process.

It has been observed that these thermal gradients can result in distortion of the object being produced, thus requiring precise thermal control of the selective laser sintering process in order for the objects produced to precisely meet the design. One cause of such distortion is warpage and shrinkage of the object due to thermal shrinkage of the sintered layer as it cools from the sintering temperature to its post-sintering temperature; in addition, shrinkage can occur due to the reduction in volume of the fused powder as it passes through the phase change from liquid to solid. In either case, the reduction in volume of the sintered powder will cause the top of the object to contract. Since underlying layers have already contracted and are immersed in unfused powder (which is a relatively good thermal insulator), tensile stress is induced at the surface, and curling of the object can result.

Another source of distortion in the production of objects by selective laser sintering is undesired growth of the part being produced beyond the volume defined by the laser beam. As is well known, the spot size of a laser beam can be made quite small so that the resolution of features in the object can be quite sharp. However, conduction of heat from the fused locations can cause powder outside of the scan to sinter to the directly sintered portion, causing the fused cross-section to "grow" beyond the area of the laser scan and thus beyond the design dimensions. Interlayer growth can also occur if sufficient heat from sintering remains in the fused portion that newly dispensed powder sinters to sintered portions of the prior layer merely upon being dispensed. It has also been observed that the presence of such growth makes more difficult the removal of the unsintered powder from the finished part (such removal referred to in the art as "rough breakout").

It is therefore an object of the present invention to provide a material that can improve the robustness of the selective laser sintering process.

It is a further object of the present invention to provide such a material that reduces distortion effects, such as curl and growth, in the selective laser sintering process.

It is a further object of the present invention to provide such a material that allows for the production of near-fully dense parts from selective laser sintering.

It is a further object of the present invention to provide such a material that improves the efficiency with which the part produced may be may be finished, for example by way of sanding.

Other objects and advantages provided by the present invention will be apparent to those of ordinary skill in the art having reference to the following specification, together with its drawings.

SUMMARY OF THE INVENTION

The invention may be implemented into a powder useful in selective laser sintering that is a composite of multiple constituents. According to the preferred embodiment of the invention, one constituent of the composite powder is a semi-crystalline powder, such as nylon 11; the other constituent of the powder is a reinforcement material, such as glass, having an average particle size that is somewhat smaller than the particle size of the semi-crystalline powder. The composite powder is formed of a mixture of, for example, approximately equal weight percentages of these two constituents, with the semi-crystalline material having a substantially lower sintering temperature than the reinforcement material. Use of this composite powder in selective laser sintering provides an improved process window, along with reduced distortion of the part produced, easier rough breakout, and improved finishability of the part. The semi-crystalline polymer results in the part being near-fully dense.

Alternatively, the lower temperature constituent may be an amorphous polymer, if a more porous finished part is to be produced.

DETAILED DESCRIPTION OF THE PREFERRED EMBODIMENTS

Figure 1:
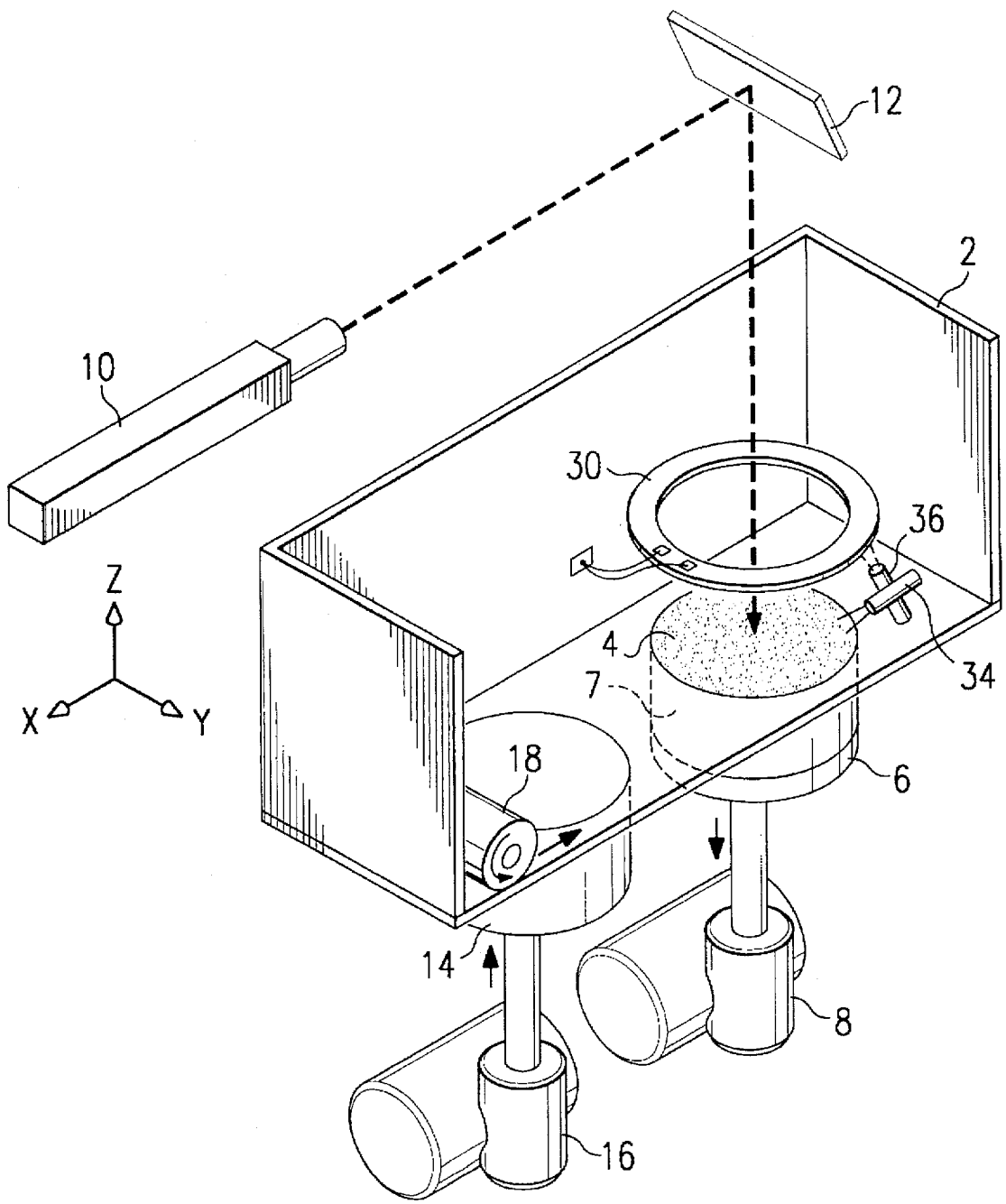
FIG. 1 is a schematic diagram of a selective laser sintering apparatus for producing three-dimensional objects from a powder in layerwise fashion, with which the preferred embodiment of the invention may be practiced.

An apparatus for performing selective laser sintering according to the present invention will first be described relative to the simplified schematic representation illustrated in FIG. 1. The preferred apparatus for performing selective laser sintering according to the present invention is the SINTERSTATION® 2000 selective laser sintering system available from DTM Corporation, to which the simplified schematic representation of FIG. 1 generally corresponds. The apparatus of the schematic representation of FIG. 1 includes a chamber 2 (front doors and the top of chamber 2 are not shown in FIG. 1, for purposes of clarity), within which the selective sintering process takes place. Target surface 4, for purposes of the description herein, refers to the top surface of heat-fusible powder (including portions previously sintered, if present) disposed on part piston 6; the sintered and unsintered powder disposed on part piston 6 will be referred to herein as part bed 7. Vertical motion of part piston 6 is controlled by motor 8. Laser 10 provides a beam which is reflected by galvanometer-controlled mirrors 12 (only one of which is shown for clarity), in the manner described in the U.S. Patents referred to hereinabove.

Referring back to FIG. 1, delivery of the heat-fusible powder is accomplished in the apparatus of FIG. 1 by way of powder piston 14, controlled by motor 16, and by counter-rotating roller 18. As described in the above-referenced U.S. Pat. No. 5,017,753, counter-rotating roller 18 transfers the powder lifted above the floor of chamber 2 to the target surface 4 in a uniform and level fashion. As described in the above-referenced U.S. Pat. No. 5,252,264, it is preferred to provide two powder pistons 14 on either side of part piston 6, for purposes of efficient and flexible powder delivery.

Control of the thermal conditions at target surface 4 has been observed to be of importance in avoiding distortion effects such as curl and growth, referred to hereinabove. In an apparatus such as that shown in FIG. 1, the preferred techniques for controlling these thermal conditions include the downdraft of a temperature controlled gas (e.g., nitrogen) through target surface 4, such as described in the above-incorporated U.S. Pat. No. 5,017,753. In addition, radiant heaters are also preferably used to uniformly raise the temperature of target surface 4 to a desired temperature, as described in the above-incorporated U.S. Pat. No. 5,155,321. As described therein, the heating of the powder at the target surface reduces thermal gradients (i.e., thermal "shock") at the target surface that occurs when a subsequent layer of the powder is applied to a recently-sintered layer; such thermal gradients can, if excessive, cause the prior layer to curl or otherwise warp.

As described in the above-incorporated U.S. Pat. No. 5,342,919, semi-crystalline materials such as nylon 11 have been used in the production of parts by way of selective laser sintering. An example of conventional nylon 11 powder that is particularly well-suited for selective laser sintering is LASERITE® LNF5000 nylon compound available from DTM Corporation, which has been found to be especially beneficial in the selective laser sintering production of "near-fully dense" parts. The term "near-fully dense" means, for purposes of this description, that the produced part mimics the flexural modulus and maximum stress at yield (psi) that it would have if it were fully dense (i.e., as if it had been isotropically molded).

According to the preferred embodiment of the invention, the heat-fusible powder used in the apparatus of FIG. 1 is a composite powder, namely a blended dry mixture of a polymer powder and a reinforcement powder. The polymer powder has a lower melting, or softening temperature than the reinforcement powder, such that the application of laser energy to the composite powder will cause particles of the polymer powder to bond to one another and to particles of the reinforcement powder, without causing any significant melting or change in phase of the reinforcement particles. As noted above, this powder is a "dry mixed" powder, such that individual particles of each of the polymer powder and the reinforcement powder are freely separate from, and not compounded with, one another.

According to the preferred embodiment of the invention, the polymer powder is preferably a semi-crystalline polymer, of a type that provides signs of crystalline order under X-ray examination, and that shows a defined crystalline melting point Tm as well as a glass transition temperature Tg. Examples of semi-crystalline polymer powder materials useful in connection with the preferred embodiment of the invention include nylon, polybutylene terephthalate (PBT) and polyacetal (PA). As described in the above-incorporated copending application Ser. No. 08/296,076, materials such as polyacetal, polypropylene, polyethylene, and ionomers, may alternatively be used as a semi-crystalline polymer constituent of the composite powder according to the present invention. The preferred semi-crystalline powder material according to this embodiment of the invention is a powder of nylon 11 in which the average particle size is on the order of 50 microns. Still more preferably, the nylon 11 constituent of the powder according to the preferred embodiment of the invention is an unblended polymer having a differential scanning calorimetry (DSC) melting peak that does not overlap with its DSC recrystallization peak when measured at a scanning rate of 10°–20° C./minute, a crystallinity in the range from 10–90% (measured by DSC), a number average molecular weight in the range from about 30,000 to 500,000 and a molecular weight distribution Mw/Mn in the range from 1 to 5. Further detail regarding the composition and attributes of the semi-crystalline powder constituent of the composite powder according to the preferred embodiment of the invention is described in copending U.S. application Ser. No. 08/298,076, filed Aug. 30 1994, assigned to DTM Corporation, and incorporated herein by this reference. As noted above, an example of such a nylon 11 powder is the LASERITE® LNF5000 nylon compound available from DTM Corporation. The melting temperature of the nylon 11 powder according to the preferred embodiment of the invention is approximately 186° C.

The reinforcement powder constituent of the composite powder according to the preferred embodiment of the invention is preferably a glass powder made up of glass microspheres (i.e., particles with substantially a spherical shape), having a mean particle size of on the order of 35 microns. While the preferred glass is an A glass powder available from Potters Industries, Inc., it is believed that the particular composition of the glass is not critical in that other glass types may be used. The glass microspheres preferably have a coating that is compatible with nylon chemistries, to provide good wetting and adhesion. An example of such a coating is an amino-functional silane. The melting temperature of the glass microspheres according to this embodiment of the invention is on the order of 704° C.

The composite powder of the preferred embodiment of the present invention is, as noted above, a blended mixture of the nylon 11 powder described hereinabove with the glass microspheres. Preferably, the composition of the blended mixture is from 50 to 90 percent by weight of the above-described nylon 11 powder, with 10 to 50 percent by weight of the above-described coated glass microspheres. The percent by weight of glass powder is limited by the packing limitations of the glass microspheres, and the ability of the low-temperature material (e.g., the nylon powder) to reliably adhere the composite into a mass when sintered; on the other hand, if less than 10 percent by weight glass reinforcement material is used, the amount of the reinforcement material is so small as to provide little advantage. The particular range of percentage composition of the constituents will depend, to some extent, upon the particle size of the reinforcement powder. The composite powder may be produced through use of conventional mixing equipment, such as a conventional V-blender.

Figure 2:
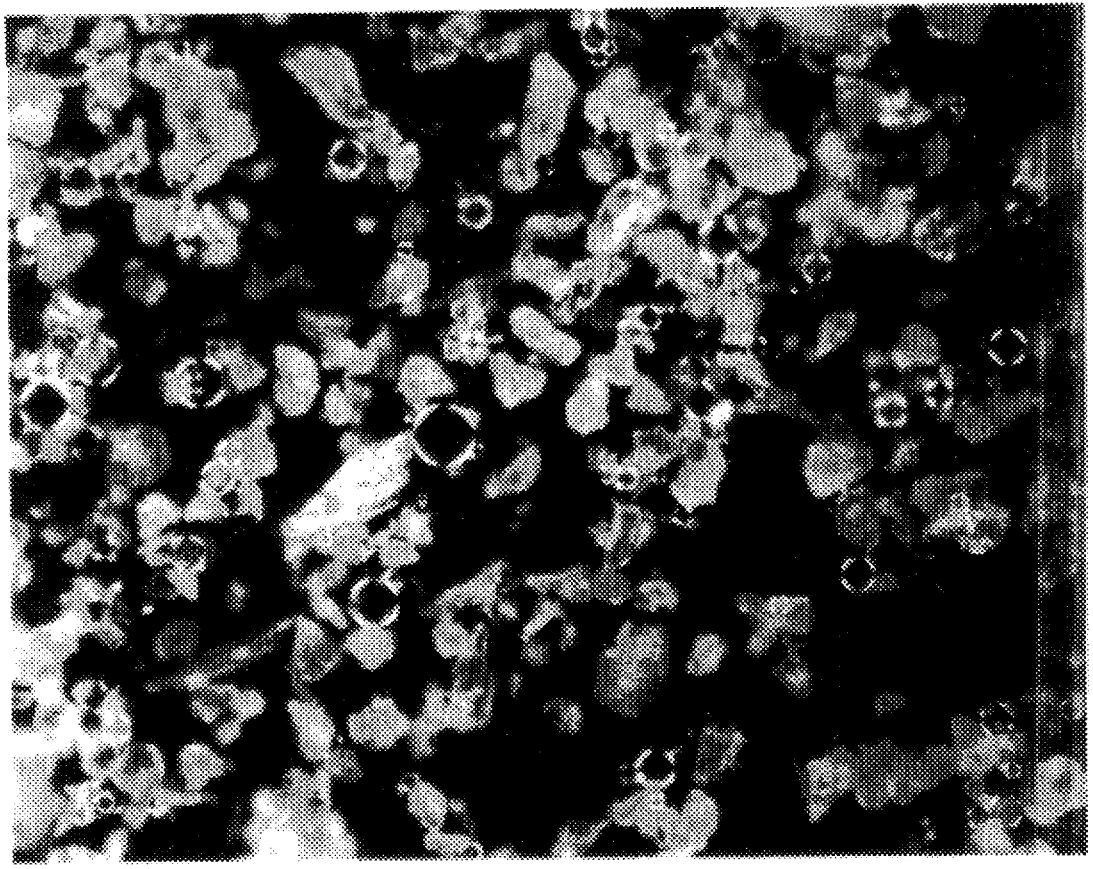
FIG. 2 is a micrograph of a composite powder according to a first preferred embodiment of the invention.

A particularly beneficial example of the composite powder according to the preferred embodiment of the invention is 50% by weight of the nylon 11 powder described above, (mean particle size 50 microns) and 50% by weight of the coated glass microspheres (mean particle size 35 microns); this composition has been observed to provide excellent overall dimensional predictability (i.e., uniform and isotropic shrinkage) when subjected to the selective laser sintering process, in combination with excellent mechanical properties such as stiffness and strength. The isotropic nature of the shrinkage behavior of the sintered composite powder according to this preferred embodiment of the invention is believed to be due to the substantially spherical shape of the reinforcement material particles in the composite powder. It will be noted that this example substantially maximizes the amount of glass reinforcement material in the composite, while providing excellent adhesion of the sintered powder. FIG. 2 is a micrograph of this exemplary composite powder, in its unsintered condition. In FIG. 2, the spherical-shaped bodies are the glass microspheres, while the irregularly shaped bodies are particles of nylon 11.

Variations in the particular percentage composition of the composite powder, within the ranges specified hereinabove, may be beneficial for particular applications.

Alternatively, other materials may be used as the polymer constituent in the composite powder if the part need not be formed to be near-fully dense. Such materials include certain amorphous polymers, such as polycarbonate, polystyrene, acrylates, and styrene/acrylate copolymers, which may serve as the polymer constituent of the composite powder in those cases where a porous part is desired. Further in the alternative, it is also contemplated that other organic or inorganic discontinuous reinforcement materials may also be used in the composite powder.

In operation according to the present invention, the apparatus of FIG. 1 supplies composite powder to chamber 2 via powder cylinder 14; the composite powder is placed into chamber 2 by the upward partial motion of powder cylinder 14 provided by motor 16. Roller 18 (preferably provided with a scraper to prevent buildup, said scraper not shown in FIG. 1 for clarity) spreads the composite powder within the chamber by translation from powder cylinder 14 toward and across target surface 4 at the surface of part bed 7 above part piston 6, in the manner described in the above-referenced U.S. Pat. No. 5,017,753 and U.S. Pat. No. 5,252,264. At the time that roller 18 is providing composite powder from powder piston 14, target surface 4 (whether a prior layer is disposed thereat or not) is preferably below the floor of chamber 2 by a small amount, for example 4 mils, defining the thickness of the powder layer to be processed. It is preferable, for smooth and thorough distribution of the composite powder, that the amount of composite powder provided by powder cylinder 14 be greater than that which can be accepted by part cylinder 6, so that some excess powder will result from the motion of roller 18 across target surface 4; this may be accomplished by the upward motion of powder piston 14 by a greater amount than the distance below the floor of chamber 2 that target surface 4 is set at (e.g., 10 mils versus 4 mils). It is also preferable to slave the counter-rotation of roller 18 to the translation of roller 18 within chamber 2, so that the ratio of rotational speed to translation speed is constant.

Further in operation, after the transfer of composite powder to target surface 4, and the return of roller 18 to its original position near powder piston 14, laser 10 (e.g., a $CO_2$ laser) selectively sinters portions of the composite powder at target surface 4 corresponding to the cross-section of the layer of the part to be produced, in the manner described in the above-referenced U.S. Patents. A particularly beneficial method of controlling the thermal selective laser sintering mechanism by controlling the scanning of the laser beam is disclosed in the above-incorporated U.S. Pat. No. 5,352,405. After completion of the selective sintering for the particular layer of composite powder, part piston 6 moves downward by an amount corresponding to the thickness of the next layer, awaiting the deposition of the next layer of composite powder from roller 18 to be added to part bed 7.

As noted above, the thermal parameters within the selective laser sintering apparatus are of importance in the production of the part. For the example where the composite powder is a 50/50 (percentage by weight) of nylon 11 and coated glass microspheres, according to the preferred example of the invention described hereinabove, the nominal operating parameters used to produce parts in a SIN-TERSTATION® 2000 selective laser sintering system available from DTM Corporation are as follows:

feed temperature: 110° C.
part bed temperature: 190° C.
$CO_2$ laser power: 3 watts
downdraft flow rate: 5 to 10 liters/min The process continues until the part to be produced is completed, after which the part and surrounding unfused composite powder are removed from the apparatus; the unfused composite powder is then removed from the part at another station (a process commonly referred to as "rough breakout"). According to the preferred embodiment of the present invention described hereinbelow, where the part is formed from a polymer-based composite powder, the process is completed by smooth finishing of the part by way of sanding or the like, to obtain the desired surface finish.

Parts have been produced by way of selective laser sintering from the composite powder of nylon 11 and glass microspheres described above according to the preferred embodiment of the invention. Micrographs of these parts have shown that the resulting parts are near-fully dense, in the manner described in the above-referenced U.S. Pat. No. 5,342,919 and copending application 08/298,076. Furthermore, incorporation of the glass microsphere reinforcement material has been observed to increase part stiffness and heat resistance, while reducing the ductility of unreinforced nylon parts.

The following table lists measured attributes of sintered parts produced from the composite powder according to the preferred embodiment of the invention, and for similar parts produced from unreinforced LASERITE® LNP5000 nylon compound:

TABLE

| Property | Composite powder | LASERITE ® compound |
| --- | --- | --- |
| DTUL (0.45 MPa) | 188° C. | 163° C. |
| DTUL (1.82 MPa) | 134° C. | 44° C. |
| Tensile Strength (at yield) | 49 MPa | 36 MPa |
| Tensile Modulus | 2828 MPa | 1400 MPa |
| Flexural Modulus | 4330 MPa | 870 MPa |

For purposes of this table, the DTUL measurements were made according to the ASTM D648 test method, the tensile strength and modulus measurements were made according to the ASTM D638 test method, and the flexural modulus measurements were made according to the ASTM D790 test method. It should be noted that, as may be expected, the impact strength and tensile elongation at break of the parts formed from the composite powder is somewhat less than that of the unreinforced nylon powder.

In addition, several extremely important and unexpected advantages have been observed to have arisen from the use of the powder according to the preferred embodiment of the invention in selective laser sintering. Firstly, use of the composite powder according to the preferred embodiment of the invention has been observed to allow for a wider processing window, measured in temperature, than in the case of unreinforced nylon 11 powder. Specifically, it has been observed that a composite powder of 50% by weight nylon 11 powder with mean particle size of 50 microns and 50% by weight coated glass microspheres with mean particle size of 35 microns may be dispensed over target surface 4 (FIG. 1) at a temperature that is up to 10° C. higher than the temperature at which substantially pure nylon 11 may be dispensed; the limit on these temperatures is the so-called caking temperature, which is the temperature at which particles of the powder begin to weakly adhere to one another. The ability to dispense at a higher powder temperature not only reduces the thermal gradients discussed above by allowing a higher temperature powder to be dispensed over the most recently sintered layer, but also allows the temperature of part bed 7 to be lower for the composite powder by on the order of 2° C. to 4° C., relative to the unreinforced nylon powder.

Furthermore, it has been observed that lower laser power may be used to selectively sinter the composite powder of the preferred embodiment of the invention than is required to sinter unreinforced nylon 11 powder; for example, it has been observed that from 2 to 4 watts less laser power may be used to sinter the composite powder relative to unreinforced nylon 11 powder. This reduction in laser power reduces the thermal variability in the melted cross section of the powder, as well as the temperature difference between the laser-irradiated powder and neighboring unsintered powder at target surface 4; both of these effects serve to reduce the incidence of curling or warping of the part being produced.

Since the difference between the temperature of the composite powder being dispensed and the temperature of part bed 7 is reduced when using the composite powder according to the preferred embodiment of the invention, the present invention reduces the incidence of in-build part warpage. Additionally, the amount of curl observed for parts built from the composite powder is approximately one-half the curl observed for similar parts built from unreinforced nylon 11 powder; furthermore, the observed linear shrinkage for the composite powder when sintered is approximately 3%, as opposed to 4% linear shrinkage observed for unreinforced powder. It is believed that the reduction in linear shrinkage for the composite powder according to the preferred embodiment of the present invention reduces the tendency of the sintered powder to develop stresses and warpage during cooling from the build temperature to the breakout temperature.

These attributes allows a wider process window for the temperature of part bed 7 in the apparatus of FIG. 1 when using the composite powder according to the preferred embodiment of the invention. For example, use of the composite powder described above has been observed to allow the temperature of part bed 7 to vary over a range of 3 to 4 degrees Celsius; in contrast, use of a pure nylon 11 powder (i.e., unreinforced powder) allows a process window for the temperature of part bed 7 of only approximately 1° C.

It has also been observed that parts formed by the selective laser sintering of the composite powder according to the preferred embodiment of the invention are easier to breakout from unsintered powder than are parts formed from the selective laser sintering of unreinforced nylon 11 powder. This is believed to be due to the reduced incidence of unwanted growth (i.e., sintering of powder from outside the laser scan to the scanned portions) observed for parts formed by the selective laser sintering of the composite powder according to the present invention, relative to parts formed from unreinforced nylon 11 powder. Several factors are believed to be responsible for this reduction in growth. Firstly, the presence of the reinforcement glass particles in the composite material reduces the amount of sinterable material at the particular temperature conditions, thus reducing the extent of any growth by reducing the available sinterable material. In addition, the lower part bed temperature and lower laser energy that may be used in connection with the composite powder of the preferred embodiment of the invention is also believed to contribute to this reduction in undesirable growth.

Another unexpected advantage of the preferred embodiment of the invention relates to the finishability of the part produced by selective laser sintering of the composite powder. As is well known in the art, parts produced by selective laser sintering are generally smooth finished, for example by way of sanding, after breakout from the unsintered powder. Parts produced from the composite powder described hereinabove have been observed to be easier to finish in this manner, requiring on the order of one-half the sanding time and effort for finishing, relative to parts formed from unreinforced nylon.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of producing a three-dimensional object, comprising the steps of
    applying a layer of a composite powder at a target surface, said composite powder comprising:
    from about 50 percent to about 90 percent by weight of a polymer powder comprising a polymer selected from the group consisting of polybutylene terephthalate, polyacetal, polypropylene, polyethylene, and ionomers, and having a melting peak and a recrystallization peak, as shown in differential scanning calorimetry traces, which do not overlap when measured at a scanning rate of 10°–20° C./minute;
    from about 10 percent to about 50 percent by weight of a reinforcement powder, dry mixed with said polymer powder, and having a melting temperature substantially higher than the melting temperature of the polymer powder; and
    a processing window, defined as a variation in a temperature of said target surface during said applying step allowing successful production of said object, wider than a similar processing window for an unreinforced version of said polymer powder;
    directing energy at selected locations of said layer corresponding to the cross-section of the object to be formed in said layer, to fuse the composite powder thereat;
    repeating said applying and directing steps to form the object in layerwise fashion; and
    removing unfused powder from said object.

2. The method of claim 1, wherein said width of said processing window is from about 3° C. to about 4° C.

3. The method of claim 1, wherein said object does not exhibit excessive curl or growth when said temperature of said target surface remains in said processing window.

4. The method of claim 1, wherein the reinforcement powder comprises glass.

5. The method of claim 1, wherein the reinforcement powder comprises substantially spherical glass particles.

6. The method of claim 1, wherein the polymer powder has a mean particle size that is larger than the mean particle size of the reinforcement powder.

7. The method of claim 5, wherein the glass particles are coated.

8. A method of producing a three-dimensional object, comprising the steps of:
    applying a layer of a composite powder at a target surface, said composite powder comprising:
    from about 50 percent to about 90 percent by weight of a polymer powder comprising a polymer selected from the group consisting of polystyrene and acrylates;
    from about 10 percent to about 50 percent by weight of a reinforcement powder, dry mixed with said polymer powder, and having a melting temperature substantially greater than the melting temperature of the polymer powder; and
    a processing window, defined as a variation in a temperature of said target surface during said applying step allowing successful production of said object, wider than a similar processing window for an unreinforced version of said polymer powder:
    directing energy at selected locations of said layer corresponding to the cross-section of the object to be formed in said layer, to fuse the composite powder thereat;
    repeating said applying and directing steps to form the object in layerwise fashion; and removing unfused powder from said object.

9. The method of claim 8, wherein the reinforcement powder comprises glass.

10. The method of claim 8, wherein the reinforcement powder comprises substantially spherical glass particles.

11. The method of claim 10, wherein the glass particles are coated.

12. The method of claim 8, wherein said object does not exhibit excessive curl or growth when said temperature of said target surface remains in said processing window.

13. The method of claim 1 wherein said directing step comprises directing a laser beam at selected locations of said layer corresponding to the cross-section of the object to be formed in said layer, to fuse the composite powder thereat.

14. The method of claim 13 wherein said step of directing a laser beam requires less laser power than is required to similarly fuse an unreinforced version of said polymer powder.

15. The method of claim 1 wherein a temperance of said composite powder applied in said applying step is higher than a temperature at which an unreinforced version of said polymer powder may similarly be applied.

16. The method of claim 15 wherein a temperature of said target surface in said applying step is lower than a temperature of a similar target surface of an unreinforced version of said polymer powder.

17. The method of claim 1 further comprising the step of smooth finishing said object.

18. The method of claim 17 wherein in said step of smooth finishing comprises sanding said object, and wherein said object requires approximately one-half a sanding time of an object similarly introduced from an unreinforced version of said polymer powder.

19. The method of claim 8 wherein said directing step comprises directing a laser beam at selected locations of said layer corresponding to the cross-section of the object to be formed in said layer to fuse the composite powder thereat.

20. The method of claim 19 wherein said step of directing a laser beam requires less laser power than is required to similarly fuse an unreinforced version of said polymer powder.

21. The method of claim 8, wherein a temperature of said composite powder applied in said applying step is higher than a temperature at which an unreinforced version of said polymer powder may be similarly applied.

22. The method of claim 21 wherein a temperature of said target surface in said applying step is lower than a temperature of a similar target surface of an unreinforced version of said polymer powder.

23. The method of claim 8 further comprising the step of smooth finishing said object.

24. The method of claim 23 wherein said step of smooth finishing comprises sanding said object, and wherein said object requires approximately one-half a sanding time of an object similarly produced from an unreinforced version of said polymer powder.

25. The method of claim 1 wherein said object has approximately one-half an amount of curl of an object similarly produced from an unreinforced version of said polymer powder.

26. The method of claim 1 wherein said object exhibits less shrinkage than an object similarly produced from an unreinforced version of said polymer powder.

27. The method of claim 1 wherein said object has a reduced incidence of growth and easier part breakout than an object similarly produced from an unreinforced version of said polymer powder.

28. The method of claim 8 wherein said object has approximately one-half an amount of curl of an object similarly produced from an unreinforced version of said polymer powder.

29. The method of claim 8 wherein said object exhibits less shrinkage than an object similarly produced from an unreinforced version of said polymer powder.

30. The method of claim 8 wherein said object has a reduced incidence of growth and easier part breakout than an object similarly produced from an unreinforced version of said polymer powder.

31. A method of producing a three-dimensional object, comprising the steps of:

applying a layer of a composite powder at a target surface, said composite powder comprising:

approximately 50 percent by weight of a nylon 11 powder having a melting peak and a recrystallization peak, as shown in differential scanning calorimetry traces, which do not overlap when measured at a scanning rate of 10°–20° C./minute, and a mean particle size of approximately 50 microns;

approximately 50 percent by weight of a reinforcement powder comprising substantially spherical glass particles, dry mixed with said polymer powder, and having a mean particle size of approximately 35 microns; and a processing window, defined as a variation in a temperature of said target surface during said applying step allowing successful production of said object, wider than a similar processing window for unreinforced nylon 11 powder;

directing energy at selected locations of said layer corresponding to the cross-section of the object to be formed in said layer, to fuse the composite powder thereat;

repeating said applying and directing steps to form the object in layerwise fashion; and removing unfused powder from said object.

32. The method of claim 31, wherein said width of said processing window is from is from about 3° C. to about 4° C.

33. The method of claim 31 wherein a temperature of said composite powder applied in said applying step is up to about 10° C. higher than a temperature at which unreinforced nylon 11 powder may similarly be applied.

34. The method of claim 33 wherein a temperature of said target surface in said applying step is from about 2° C. to about 4° C. lower than a temperature of a similar target surface of unreinforced nylon 11 powder.

* * * * *